United States Patent [19]

Kawabe et al.

[11] 4,302,906
[45] Dec. 1, 1981

[54] SOILLESS CULTURE DEVICE

[75] Inventors: Hidehiko Kawabe, Hirakata; Yozo Yoshino, Yawata; Yozo Jizodo, Kasuga, all of Japan

[73] Assignee: Matsushita Electric Industrial Co., Ltd., Osaka, Japan

[21] Appl. No.: 142,119

[22] Filed: Apr. 21, 1980

[51] Int. Cl.³ ............................................. A01G 31/02
[52] U.S. Cl. .......................................... 47/62; 47/1.4
[58] Field of Search ............................. 47/59, 62–63, 47/1.4

[56] References Cited

U.S. PATENT DOCUMENTS

| | | | |
|---|---|---|---|
| 2,674,828 | 4/1954 | Tegner | 47/62 |
| 3,468,057 | 9/1969 | Buisson et al. | 47/1.4 X |
| 3,660,933 | 5/1972 | Wong | 47/62 |
| 3,768,200 | 10/1973 | Klock | 47/1.4 |
| 3,839,198 | 10/1974 | Shelef | 47/1.4 X |
| 3,955,317 | 5/1976 | Gudin | 47/1.4 X |
| 4,084,346 | 4/1978 | Stengel et al. | 47/1.4 |

Primary Examiner—Robert E. Bagwill
Attorney, Agent, or Firm—Joseph W. Farley

[57] ABSTRACT

This invention relates to a soilless culture device comprising a culture solution tank and a cultivation vessel having a flow path for the solution fed from the solution tank. Where the solution flow path, or cultivation vessel is substantially long, the flow path is arranged to turn at an intermediate point so that it is divided into two portions, forward and return, disposed in parallel relation and allowed to communicate with each other at any desired point by means of a short-circuiting path. Equalization of the culture solution between the supply side and the discharge side can be thus attained. A level regulating pipe adapted to regulate the solution level in the cultivation vessel is provided between the solution tank and the cultivation vessel. A cup for adjusting the solution level is removably mounted in the opening of the level regulating pipe.

6 Claims, 5 Drawing Figures

Length of Solusion Flow Path
(Number of Tomato Plants)
Direction of Flow ⟶

SOILLESS CULTURE DEVICE

This invention relates to a soilless culture device having a culture solution tank and a cultivation vessel including a flow path for the culture solution fed from the culture solution tank, and more particularly to such a device wherein the cultivation vessel is substantially long.

Generally, in soilless plant cultivation it is desirable to have a sufficient amount of oxygen dissolved in the culture solution to permit a satisfactory growth of plants. Where a soilless culture device is employed which has a relatively short cultivation vessel and accordingly a relatively short flow path for the culture solution, there is no difficulty involved in this connection. However, in a culture device of the type wherein a cultivation vessel extends over a length of 10 to 20 m, for example, or a plurality of cultivation vessels are connected in series, and accordingly a substantially long flow path of culture solution is involved, the concentration of the dissolved oxygen in the culture solution decreases as the solution gets farther away from a solution feeding end, with the result that the growth of plants is adversely affected. A known arrangement for avoiding such unfavorable development is to use certain special means for supplying oxygen into the solution. Use of such special means is undesirable because it adds complexity to the device. Another known arrangement is to change the level of the solution from a high level to a low level so that when the level of the solution is lowered, the roots of the plants are exposed to air, whereby they are supplied with oxygen. Such arrangement requires means for changing the level of the solution at certain intervals. Moreover, exposure of plant roots to air may adversely affect the plant roots.

It is a principal object of the present invention to provide a soilless cultivation vessel having a relatively long path of solution flow, which permits the presence of dissolved oxygen of a sufficient concentration in the flowing culture solution and which allows equalization of dissolved oxygen concentration at various locations in the vessel.

It is another object of the invention to provide a soilless cultivation vessel in which the level of the culture solution is controllable according to different stages of plant growth so as to permit satisfactory cultivation.

Many other features and advantages of the invention will be readily seen from the description of preferred embodiments which follows.

Figure 1:
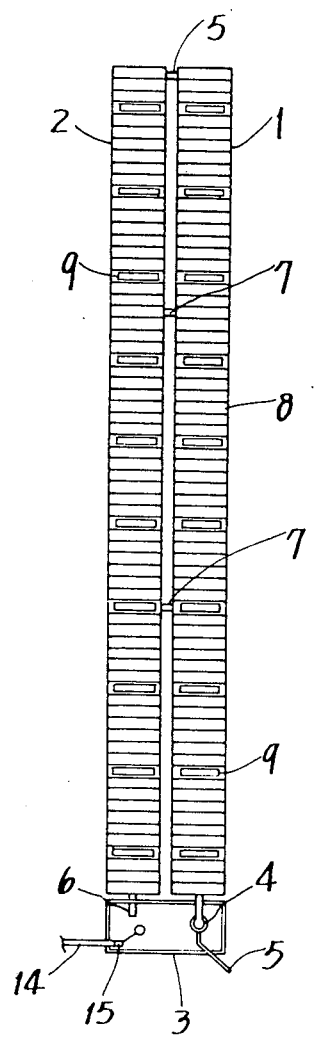
FIG. 1 is a top plan view of a soilless culture device embodying the invention.

Referring to FIG. 1, numerals 1 and 2 are soilless cultivation vessels, each of a relatively long formation, arranged in parallel relation. A culture solution tank 3 is located adjacent to one end of the pair of cultivation vessels 1, 2. A sufficient amount of oxygen is dissolved in the culture solution in the tank 3, from which culture solution containing dissolved oxygen is fed into the first cultivation vessel 1 at one end thereof through a feed pipe 4. One end of the second cultivation vessel is connected to the solution tank 3 through a reflux pipe 6. The other ends of the first and second cultivation vessels 1, 2 communicate with each other through a communicating pipe 5. Thus, a path of solution flow is formed which consists of the first cultivation vessel as the forward portion of the path and the second cultivation vessel as the backward portion. The reflux pipe 6 serves as an overflow pipe to determine the level of the solution. The first and second cultivation vessles, 1, 2, that is, the forward and return portions of the solution flow path are short-circuited by one or more short-circuiting pipes 7.

Figure 2:
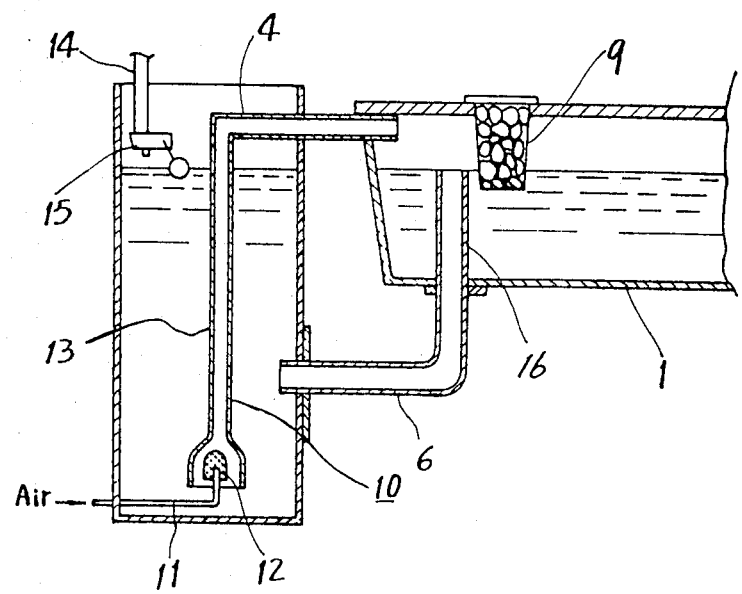
FIG. 2 is a vertical section of a principal portion of the device shown in FIG. 1.

The cultivation vessels 1, 2, each has a cover 8 and is provided with cultivation pots 9. The culture solution tank 3 has a solution feeder 10, which is so arranged that compressed air delivered by an air feeder 11 is conducted to a porous bubble generator 12 disposed at one end of a pipe 13, whereby bubbles are generated, said bubbles forcing out culture solution as they ascend in the pipe 13 and simultaneously allowing oxygen to be dissolved in the solution. The other end of the pipe 13 is connected to the feed pipe 4. In FIG. 2, numeral 14 is a solution feed pipe, 15 an actuating valve for automatic solution feed, provided at the discharge end of the pipe 14, and 16 is a solution level regulating pipe provided in the cultivation vessel 1 or 2, one end portion of the level regulating pipe 16 extending upwardly from the bottom of the cultivation vessel 2 to open at its top end, and the other end being connected to the reflux pipe 6. The air feed pipe 11 is drawn through a side wall of the culture solution tank 3, but it may be drawn through the opening of the tank 3.

In a soilless culture device of such construction as described above, the culture solution in the solution tank 3 circulates along the flow path consisting of the forward path portion of the cultivation vessel 1 and the return path portion of the cultivation vessel 2 to nourish the plants in the cultivation pots with the culture solution. The concentration of dissolved oxygen in the culture solution flowing along the solution flow path decreases in proportion to the distance of flow. If the two cultivation vessels 1, 2 are connected in series, the concentration of dissolved oxygen in the cultivation vessel 2 at the solution discharge end is considerably lower than the concentration of dissolved oxygen in the vessel 1 at the solution feed end. In the present invention, however, one or more short-circuiting paths are provided between the first and second cultivation vessels 1, 2 so that solution of higher dissolved oxygen concentration in the first cultivation vessel 1 is short circuited to flow into the second cultivation vessel 2, whereby the concentration of dissolved oxygen in the first and second vessels 1, 2 are equalized. Thus, it is possible to equalize dissolved oxygen concentration throughout the entire cultivation system, thereby creating a circumstance which permits cultivation of all the plants in a uniform manner.

Figure 3:
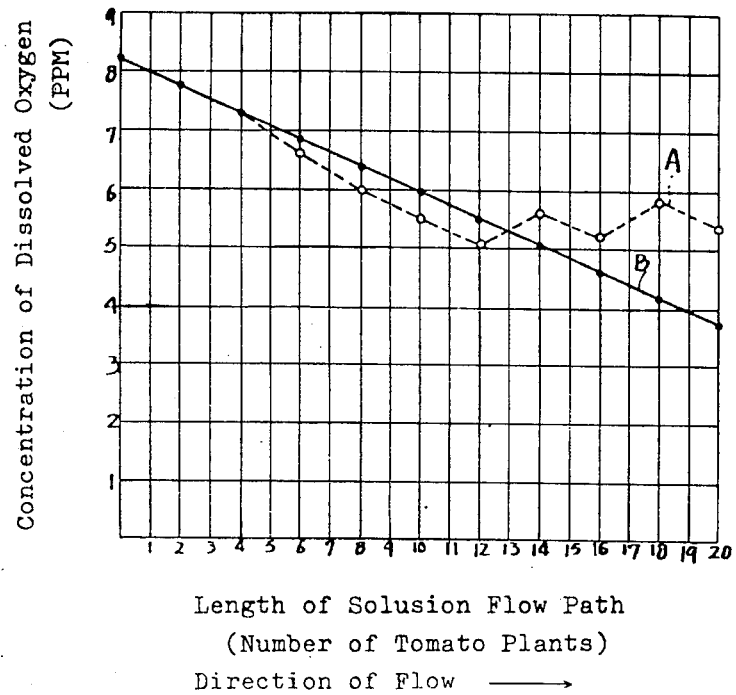
FIG. 3 is a graphical representation of actual measurements as to concentration of dissolved oxygen in the soilless culture device shown in FIGS. 1 and 2.

FIG. 3 shows actual measurements of dissolved oxygen concentration in the operation of the device illustrated in FIGS. 1 and 2. Twenty tomato plants were planted in equally spaced apart relation in the device. Measurement was made 55 days after seeding. The solution temperature was 25° C., and the flow rate of the solution was 1 l/min. As is apparent from FIG. 3, where no short-circuiting path is provided, the concentration of dissolved oxygen decreases in proportion to the length of the solution flow path as the characteristic value line B indicates, whereas in the device of the present invention which is provided with a short-circuiting path, a satisfactorily high concentration of dissolved oxygen is maintained at the discharge end of solution as the characteristic value line A indicates.

According to this embodiment of the invention, it is possible to maintain a uniform and satisfactory concentration of dissolved oxygen in the culture solution over the entire soilless cultivation system, without difficulty even where the solution flow path is substantially long and without the necessity of any special oxygen supply means. This manifests that the device is of great utility.

In the above described embodiment, two cultivation vessels are arranged in parallel relation, but each of the two may be composed of a plurality of cultivation vessels connected in series. The cultivation vessels may not necessarily be arranged in parallel relation, unless they are so arranged to be short-circuited at points equally spaced apart from the middle point of the solution flow path.

Next, an improved embodiment of the invention will be described. Generally, in soilless cultivation, and more particularly in the cultivation of fruit vegetables which involves a longer period of growth, it is undesirable to keep the same degree of moisture as is most suitable for germination, throughout the whole cultivation period from seeding to harvesting, because such degree of moisture means too much moisture for grown plants and may cause such unfovorable effects to the plants as rotten plant base and less nourishment absorption. Therefore, it is desirable to give adequate moisture to the plant bed during a period from seeding to the initial stage of growth for accelerating germination and initial growth, and to allow the cultivation bed near the plant base to dry when the plants have grown and become well rooted, thereby making the plant base less liable to rot.

Heretofore, it has been the case with ordinary soilless cultivation that during the period of seeding through havesting, moisture in the cultivation bed is constantly maintained in such a condition as is most suitable for germination, and as the result, the growth of the plants is adversely affected; for example, the plant base is liable to rot, or to grow slender and contracted into prostration. Consequently, in fruit vegetable cultivation which involves a longer period of growth, it has not been possible to expect increased crops. Deformity has often been found with fruit vegetables.

Figure 4:
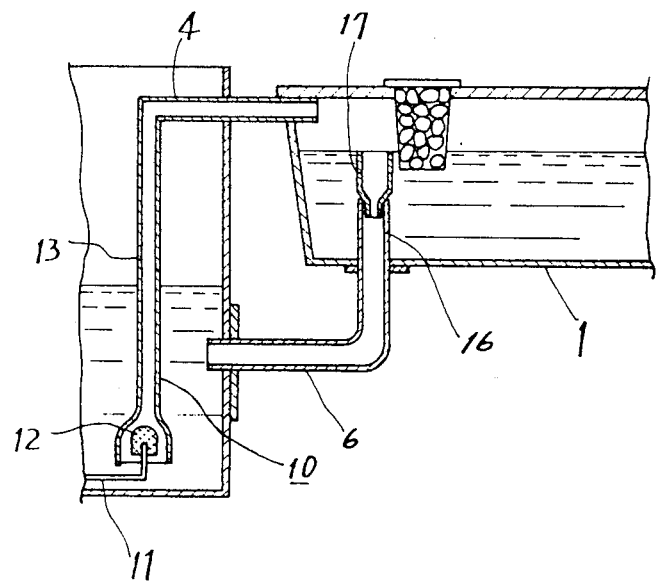
FIG. 4 is a vertical section of a principal portion of an improved embodiment of the invention.

In the embodiment shown in FIGS. 1 and 2, it is desirable to effect some improvement on the opening of the level regulating tube so as to provide a solution level most suitable according to the stage of plant cultivation. FIG. 4 shows an example of such improvement. It differs from what is shown in FIG. 2 in that a cup 17 for adjusting the solution level is removably provided in the opening of the level regulating pipe 16.

Figure 5:
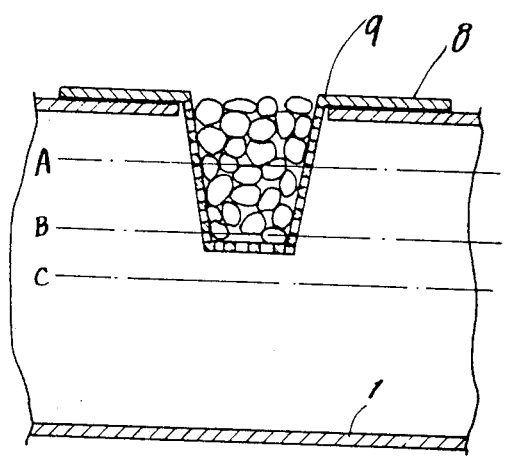
FIG. 5 is an explanatory representation of the level of solution in a cultivation vessel.

A comparison was made between the case where the solution level was kept constant in the cultivation vessel as in the embodiment shown in FIG. 2 and the case where a variety of cups 17 like the one shown in FIG. 4 were prepared for replacement, one for another, according to different growth stages of plants, whereby the solution level was adjusted in the cultivation vessel. Tomato was taken as a typical vegetable suitable for the comparison purpose. Tests were made as to solution level setting after plant growth. As FIG. 5 shows, cultivation at the initial stage of growth was made at level A. Post-growth stage of cultivation was carried out at levels A, B and C. The results are as shown in the following table. "Post-growth" means the condition that germination appears and the roots extend outwardly from the cup, this being some 30 days after seeding. The culture solution used was an equilibrated culture solution containing magnesium sulfate ($MgSO_4.7H_2O$), 4 me/l, calcium nitrate ($Ca(NO_3)_2.4H_2O$), 8 me/l, potassium nitrate ($KNO_3$) 8 me/l, ammonium phosphate ($NH_4H_2PO_4$), 4 me/l, and traces of iron, manganese, copper, and so on.

| Solution level | Yield per tomato plant (g) |
| --- | --- |
| A | 3,200 |
| B | 3,070 |
| C | 4,910 |

Occurrences of plant base rot which would have a great bearing upon the nourishment absorption of the plants were as follows: of 4 plants each cultivated, 4 at level A; 3 at level B, and none at level C.

On the basis of these results, it is apparent that a solution level lower than the lower end of the cultivation cup is preferable. Second and third post-growth cultivation tests were made at solution levels A and C. The results are compared in the following table. Apparently, where the solution level is lowered during post-growth cultivation, higher yield can be obtained.

| Cultivation method | Yield per plant (g) | | | |
| --- | --- | --- | --- | --- |
| | First test | Second test | Third test | Average |
| I Solution level A → C | 4,910 | 6,380 | 5,570 | 5,620 |
| II Solution level A | 3,200 | 3,730 | 2,970 | 3,300 |

As above described, according to the present invention, it is possible to lower the solution level below the lower end of the cultivaton cup so that plant rotting at the plant base can be prevented. Even after the roots are well established, this is very advantageous. Moreover, the device according to the invention is of very simple construction. Therefore, it can be said that the method of soilless culture using the device of the invention is very practical.

What is claimed is:

1. A soilless culture device comprising a culture solution tank, a cultivation vessel providing a flow path for a culture solution fed from said solution tank, said solution flow path having forward and return path portions connected at one end thereof to a feed pipe and to a reflux pipe respectively and communicating with each other at the other end, at least one short-circuiting means for communication between said forward and return path portions at any selected point, and means for forcibly feeding culture solution together with bubbles to said feed pipe from the solution tank.

2. A soilless culture device as set forth in claim 1 wherein a solution level regulating pipe extending upwardly from the bottom of the cultivation vessel and opening at its upper end is connected to one end of said reflux pipe.

3. A soilless culture device as set forth in claim 2 wherein a cup for adjusting solution level is removably provided in the upper end opening of said solution level regulating pipe.

4. A soilless culture device as set forth in claim 1 wherein said means for forcibly feeding solution and bubbles comprise a bubble generating means disposed in said feed pipe.

5. A soilless culture device as set forth in claim 1 wherein said solution flow path has forward and return path portions provided by two vessels.

6. A soilless culture device as set forth in claim 1 wherein said solution flow path has forward and return path portions provided by a plurality of vessels connected in series.

* * * * *